(12) United States Patent
Gugumus

(10) Patent No.: US 6,365,651 B1
(45) Date of Patent: Apr. 2, 2002

(54) SYNERGISTIC STABILIZER MIXTURE

(75) Inventor: François Gugumus, Allschwil (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/271,721

(22) Filed: Mar. 18, 1999

Related U.S. Application Data

(62) Division of application No. 08/863,314, filed on May 27, 1997, now Pat. No. 6,020,406, which is a continuation of application No. 08/595,464, filed on Feb. 5, 1996, now abandoned.

(30) Foreign Application Priority Data

Feb. 10, 1995 (EP) .......................................... 95 810 091

(51) Int. Cl.⁷ ............................................... C08K 5/35
(52) U.S. Cl. ........................................................ 524/95
(58) Field of Search ........................................ 524/100

(56) References Cited

U.S. PATENT DOCUMENTS

| | | | |
|---|---|---|---|
| 4,086,204 A | 4/1978 | Cassandrini et al. | 524/100 |
| 4,233,412 A | 11/1980 | Rody et al. | 525/167 |
| 4,331,586 A | 5/1982 | Hardy | 524/97 |
| 4,340,534 A | 7/1982 | Wiezer et al. | 524/99 |
| 4,477,615 A | 10/1984 | Raspanti et al. | 524/100 |
| 4,520,171 A | 5/1985 | Diveley et al. | 524/100 |
| 4,529,760 A | 7/1985 | Leistner et al. | 524/102 |
| 4,692,486 A | 9/1987 | Gugumus | 524/100 |
| 4,857,595 A | 8/1989 | Kazmierzak et al. | 525/142 |
| 4,863,981 A | 9/1989 | Gugumus | 524/97 |
| 4,866,136 A | 9/1989 | MacLeay | 525/375 |
| 4,957,953 A | 9/1990 | Kikkawa et al. | 524/99 |
| 4,997,938 A | 3/1991 | Cantatore et al. | 524/98 |
| 5,021,485 A | 6/1991 | Gugumus | 524/100 |
| 5,051,458 A | 9/1991 | Costanzi et al. | 524/99 |
| 5,169,925 A | 12/1992 | Schmailzl et al. | 524/95 |
| 5,439,959 A | 8/1995 | Raspanti | 524/100 |
| 5,658,973 A | 8/1997 | Raspanti | 524/99 |
| 6,020,406 A | * 2/2000 | Gugumus | 524/95 |

FOREIGN PATENT DOCUMENTS

| | | |
|---|---|---|
| DE | 262439 | 11/1988 |
| DE | 4239437 | 5/1994 |
| EP | 0449685 | 10/1991 |
| EP | 0492555 | 7/1992 |
| EP | 0573113 | 12/1993 |
| EP | 0632092 | 1/1995 |
| GB | 2267499 | 12/1993 |
| WO | 9212201 | 7/1992 |
| WO | 9422946 | 10/1994 |
| WO | 9424344 | 10/1994 |

OTHER PUBLICATIONS

Chem. Abstr. 119, 9570d, 9571v, Kogaku Kogyo 1993, 44(4), pp. 306–313, 281–295 (Japan).
Chem. Abstr. 124, 31335w and 14779w, Plastverarbieter 1995, 46(8), 36, 39–40, 42 (Germany).
Research Disclosure, 1/93, No. 345.
Derwent Abstr. 94–177274/22.
Chem. Abstr. 120, 219214c, 219215d, Shinsozai 1993, 4(6), 51–64 (Japan).
Material Safety Data Sheet, Uvasorb Hass, Nov. 1, 1993, Cas. No. 136504–96–6.
Derwent Abstr. 89–122983/17.
Chem. Abstr. 111:58964u.
Chem. Abstr. 123:34185n of Semin. Org. Synth. Summer Sch. " A. Corbella", 18$^{th}$, 1993, pp. 135–153, Borzatta et al.
Chem. Abstr. 119:9569a of Kagaku Kogyo 1993, 44(4), pp. 281–286, S. Yachigo, (Japan).
Chem. Abstr. 119:9570u of Kagaku Kogyo 1993, 44(4), pp. 287–295, K. Kikkawa (Japan).

* cited by examiner

Primary Examiner—Veronica P. Hoke
(74) Attorney, Agent, or Firm—Tyler A. Stevenson; David R. Crichton

(57) ABSTRACT

A synergistic stabilizer mixture comprising a component a) and, for example, a component b), where component a) is at least one compound of the formula I

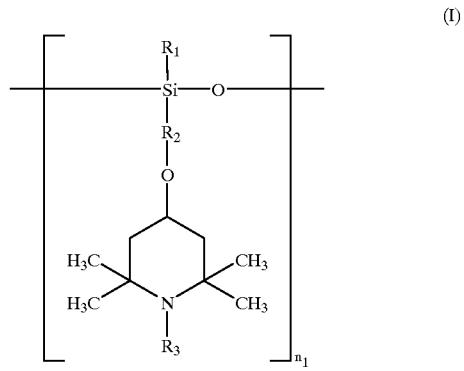

(I)

in which
$R_1$ is $C_1$–$C_{10}$alkyl, $C_5$–$C_{12}$cycloalkyl, $C_1$–$C_4$alkyl-substituted $C_5$–$C_{12}$cycloalkyl, phenyl or $C_1$–$C_{10}$alkyl-substituted phenyl, $R_2$ is $C_3$–$C_{10}$alkylene, $R_3$ is hydrogen, $C_1$–$C_8$alkyl, O, —$CH_2$CN, $C_3$–$C_6$alkenyl, $C_7$–$C_9$phenylalkyl, $C_7$–$C_9$phenylalkyl which is substituted on the phenyl radical by $C_1$–$C_4$alkyl; or $C_1$–$C_8$acyl, and $n_1$ is a number from 1 to 50,
and component b) another HALS compound.

9 Claims, No Drawings

SYNERGISTIC STABILIZER MIXTURE

This is a divisional of application Ser. No. 08/863,314, filed May 27, 1997, now U.S. Pat. No. 6,020,406, which is a continuation of application Ser. No. 08/595,464, filed Feb. 5, 1996, abandoned.

The present invention relates to a stabilizer system comprising two specific high-molecular-weight polyalkylpiperidine derivatives, to the use of this stabilizer system for stabilizing organic material, and to the organic material protected against thermal, oxidative or light-induced degradation by means of the stabilizer system mentioned. U.S. Pat. Nos. 4,692,486, 4,863,981, 4,957,953, WO-A-92/12 201, EP-A-449 685, EP-A-632 092, GB-A-2 267 499 and Research Disclosure 34549 (January 1993) describe stabilizer mixtures comprising two polyalkylpiperidine derivatives.

The present invention relates to a stabilizer mixture comprising a component a) and a component b), c), d), e), f) or g), where component a) is at least one compound of the formula I

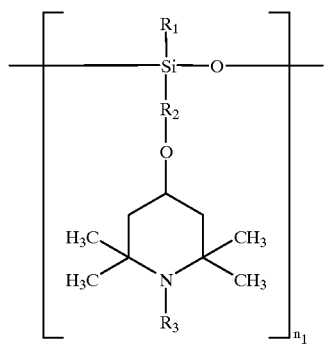

(I)

in which
$R_1$ is $C_1$–$C_{10}$alkyl, $C_5$–$C_{12}$cycloalkyl, $C_1$–$C_4$alkyl-substituted $C_5$–$C_{12}$cycloalkyl, phenyl or $C_1$–$C_{10}$alkyl-substituted phenyl,
$R_2$ is $C_3$–$C_{10}$alkylene,
$R_3$ is hydrogen, $C_1$–$C_8$alkyl, O, —$CH_2CN$, $C_3$–$C_6$alkenyl, $C_7$–$C_9$phenylalkyl, $C_7$–$C_9$phenylalkyl which is substituted on the phenyl radical by $C_1$–$C_4$alkyl; or $C_1$–$C_8$acyl and,
$n_1$ is a number from 1 to 50;
component b) is at least one compound of the formula (II)

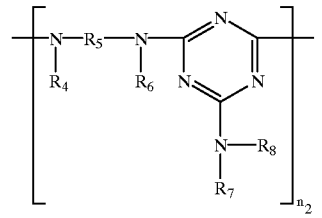

(II)

in which $R_4$, $R_6$, $R_7$ and $R_8$, independently of one another, are hydrogen, $C_1$–$C_{12}$alkyl, $C_5$–$C_{12}$cycloalkyl, $C_1$–$C_4$-alkyl-substituted $C_5$–$C_{12}$cycloalkyl, phenyl, phenyl which is substituted by —OH and/or $C_1$–$C_{10}$alkyl; $C_7$–$C_9$phenylalkyl, $C_7$–$C_9$phenylalkyl which is substituted on the phenyl radical by —OH and/or $C_1$–$C_{10}$alkyl; or a group of the formula III

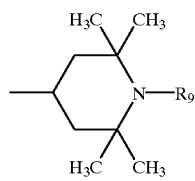

(III)

$R_5$ is $C_2$–$C_{18}$alkylene, $C_5$–$C_7$cycloalkylene or $C_1$–$C_4$alkylenedi($C_5$–$C_7$cycloalkylene), or the radicals $R_4$, $R_5$ and $R_6$, together with the nitrogen atoms to which they are bonded, perform a 5- to 10-membered heterocyclic ring, or
$R_7$ and $R_8$, together with the nitrogen atom to which they are bonded, form a 5- to 10-membered heterocyclic ring,
$R_9$ is as defined for $R_3$,
$n_2$ is a number from 2 to 50, and
at least one of the radicals $R_4$, $R_6$, $R_7$ and $R_8$ is a group of the formula (III);
component c) is a product obtainable by reacting a product, obtained by reaction of a polyamine of the formula IVa with cyanuric chloride, with a compound of the formula IVb

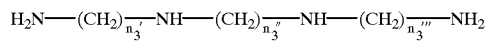

(IVa)

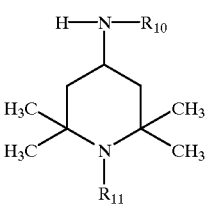

(IVb)

in which $n_3'$, $n_3''$ and $n_3'''$, independently of one another are a number from 2 to 12, $R_{10}$ is hydrogen, $C_1$–$C_{12}$alkyl, $C_5$–$C_{12}$cycloalkyl, phenyl or $C_7$–$C_9$phenylalkyl, and $R_{11}$ is as defined for $R_3$;
component d) is at least one compound of the formula (V)

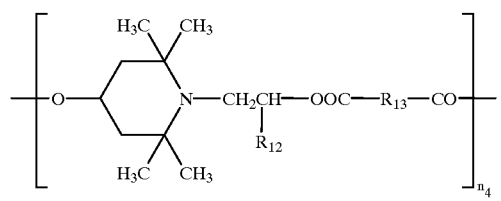

(V)

in which
$R_{12}$ is hydrogen or methyl,
$R_{13}$ is a direct bond or $C_1$–$C_{10}$alkylene and
$n_4$ is a number from 2 to 50;
component e) is at least one compound of the formulae (VIa) and (VIb)

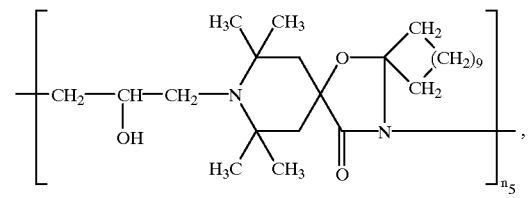

(VIa)

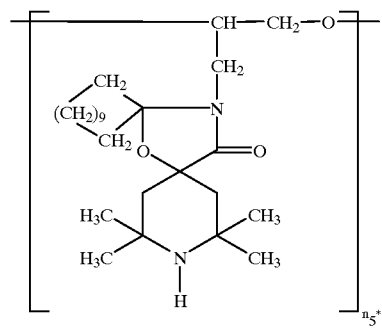

(VIb)

in which $n_5$ and $n_5^*$ independently of one another are a number from 2 to 50;

component f) is at least one compound of the formula (VI)

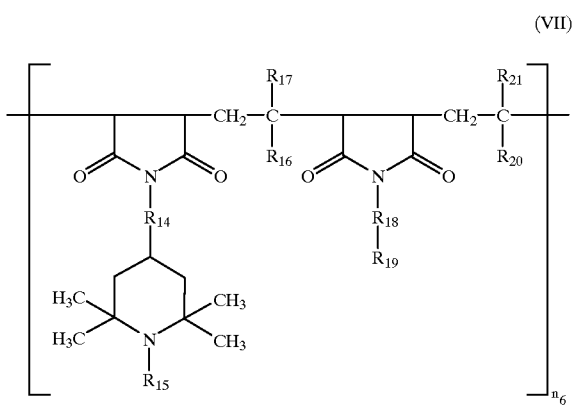

(VII)

in which $R_{14}$ and $R_{18}$, independently of one another, are a direct bond or an —N($X_1$)—CO—$X_2$—CO—N($X_3$)— group, where $X_1$ and $X_3$, independently of one another, are hydrogen, $C_1$–$C_8$alkyl, $C_5$–$C_{12}$cycloalkyl, phenyl, $C_7$–$C_9$phenylalkyl or a group of the formula III, $X_2$ is a direct bond or $C_1$–$C_4$alkylene, $R_{15}$ is as defined for $R_3$, $R_{16}$, $R_{17}$, $R_{20}$ and $R_{21}$, independently of one another, are hydrogen, $C_1$–$C_{30}$alkyl, $C_5$–$C_{12}$cycloalkyl or phenyl, $R_{19}$ is hydrogen, $C_1$–$C_{30}$alkyl, $C_5$–$C_{12}$cycloalkyl, $C_7$–$C_9$phenylalkyl, phenyl or a group of the formula III, and $n_6$ is a number from 1 to 50;

component g) is at least one compound of the formula (VIII)

1-methylundecyl dodecyl, 1,1,3,3,5,5-hexamethylhexyl, tridecyl, tetradecyl, pentadecyl, hexadecyl, heptadecyl, octadecyl, eicosyl, docosyl and triacontyl. One of the preferred meanings of $R_3$, $R_9$, $R_{11}$, $R_{15}$, $R_{17}$, $R_{21}$ and $R_{27}$ is $C_1$–$C_4$alkyl, in particular methyl. One of the preferred meanings of $R_{16}$ and $R_{20}$ is $C_1$–$C_{25}$alkyl, in particular $C_{15}$–$C_{25}$alkyl, for example hexadecyl and $C_{18}$–$C_{22}$alkyl. One of the preferred meanings of $R_{19}$ is $C_1$–$C_{25}$alkyl, in particular octadecyl.

Examples of $C_5$–$C_{12}$cycloalkyl are cyclopentyl, cyclohexyl, cycloheptyl, cyclooctyl and cyclododecyl. $C_5$–$C_8$cycloalkyl, in particular cyclohexyl, is preferred.

$C_1$–$C_4$Alkyl-substituted $C_5$–$C_{12}$cycloalkyl is, for example, methylcyclohexyl or dimethylcyclohexyl.

Phenyl which is substituted by —OH and/or $C_1$–$C_{10}$alkyl is, for example, methylphenyl, dimethylphenyl, trimethylphenyl, tert-butylphenyl or 3,5-di-tert-butyl-4-hydroxyphenyl.

Examples of $C_7$–$C_9$phenylalkyl are benzyl and phenylethyl.

$C_7$–$C_9$phenylalkyl which is substituted by —OH and/or alkyl with up to 10 carbon atoms on the phenyl radical is, for example, methylbenzyl, dimethylbenzyl, trimethylbenzyl, tert-butylbenzyl, or 3,5-di-tert-butyl-4-hydroxyphenyl.

Examples of $C_3$–$C_6$alkenyl are allyl, 2-methallyl, butenyl, pentenyl and hexenyl. Allyl is preferred.

$C_1$–$C_8$acyl is preferably $C_1$–$C_8$alkanoyl, $C_3$–$C_8$alkenoyl or benzoyl. Examples are formyl, acetyl, propionyl, butyryl, pentanoyl, hexanoyl, octanoyl, benzoyl, acryloyl and crotonyl.

Examples of alkylene having up to 18 carbon atoms are methylene, ethylene, propylene, trimethylene, tetramethylene, pentamethylene, 2,2-dimethyltrimethylene,

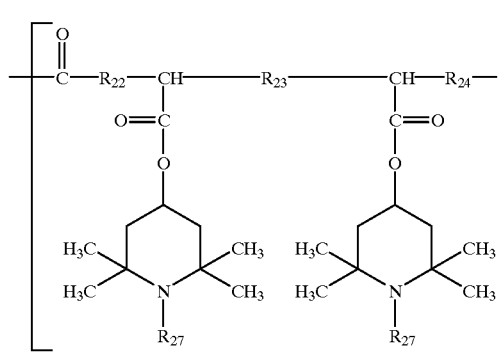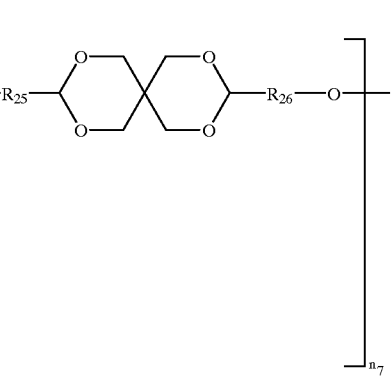

(VIII)

in which $R_{22}$, $R_{23}$, $R_{24}$, $R_{25}$ and $R_{26}$, independently of one another, are a direct bond or $C_1$–$C_{10}$alkylene, $R_{27}$ is as defined for $R_3$, and $n_7$ is a number from 1 to 50.

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, hexamethylene, trimethylhexamethylene, octamethylene and decamethylene. $R_5$ is preferably hexamethylene, $R_{13}$ is preferably ethylene, $R_{22}$ and $R_{24}$ are preferably methylene, $R_{25}$ is preferably 2,2-dimethylethylene and $R_{26}$ is preferably 1,1-dimethylethylene.

An example of $C_5$–$C_7$cycloalkylene is cyclohexylene.

An example of $C_1$–$C_4$alkylenedi($C_5$–$C_7$cycloalkylene) is methylenedicyclohexylene.

If the radicals $R_4$, $R_5$ and $R_6$, together with the nitrogen atoms to which they are bonded, form a 5- to 10-membered heterocyclic ring, this is, for example,

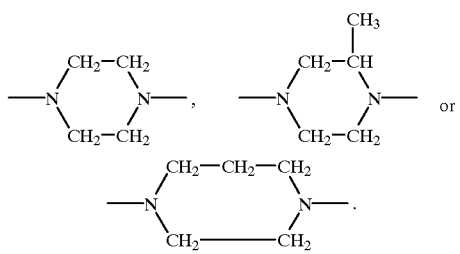

A 6-membered heterocyclic ring is preferred.

If the radicals $R_7$ and $R_8$, together with the nitrogen atom to which they are bonded, form a 5- to 10-membered heterocyclic ring, this is, for example, 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred meanings of $R_{16}$ and $R_{20}$ is phenyl. $X_2$ and $R_{23}$ are preferably a direct bond.

$X_1$, $X_3$, $R_3$, $R_9$, $R_{11}$, $R_{15}$ and $R_{27}$ are preferably hydrogen.

$n_1$ is preferably 1–25, in particular 2–20 or 2–10.

$n_2$ is preferably 2–25.

$n_3'$, $n_3''$, $n_3'''$ are preferably 2–4.

$n_4$ is preferably 2–25, in particular 2–20 or 2–10.

$n_5$ and $n_5^*$ are preferably 2–25, in particular 2–20 or 2–10.

$n_6$ is preferably 1–25, in particular 1–20 or 1–10.

$n_7$ is preferably 1–25, in particular 1–20 or 1–10.

The compounds described as components a) to g) are essentially known (in some cases commercially available) and can be prepared by known processes, for example as described in U.S. Pat. Nos. 5,051,458, 4,086,204, 4,331,586, 4,477,615 and Chemical Abstracts- CAS No. 136 504-96-6, U.S. Pat. Nos. 4,233,412, 4,340,534, 4,857,595, DD-A-262 439 (Derwent 89-122 983/17, Chemical Abstracts 111:58 964u), DE-A-4 239 437 (Derwent 94-177 274/22) and U.S. Pat. No. 4,529,760.

Component c) can be prepared analogously to known processes, for example by reaction of a polyamine of the formula IVa with cyanuric chloride in a molar ratio of from 1:2 to 1:4 in the presence of anhydrous lithium carbonate, sodium carbonate or potassium carbonate in an organic solvent, such as 1,2-dichloroethane, toluene, xylene, benzene, dioxane or tert-amyl alcohol, at a temperature of from −20° C. to +10° C., preferably from −10° C. to +10° C., in particular from 0° C. to +10° C., for from 2 to 8 hours, followed by reaction of the resultant product with a 2,2,6, 6-tetramethyl-4-piperidylamine of the formula IVb. The molar ratio between 2,2,6,6-tetramethyl-4-piperidylamine and polyamine of the formula IVa is, for example, from 4:1 to 8:1. The amount of 2,2,6,6-tetramethyl-4-piperidylamine can be added in one portion or in more than one portion at intervals of a few hours.

The polyamine of the formula IVa:cyanuric chloride:2,2, 6,6-tetramethyl-4-piperidylamine of the formula IVb ratio is preferably from 1:3:5 to 1:3:6.

The following example indicates one way of preparing the preferred component c).

EXAMPLE 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted at 5° C. for 3 hours with stirring in 250 ml of 1,2-dichloroethane. The mixture is warmed at room temperature for a further 4 hours. 27.2 g (0.128 mol) of N-(2,2,6,6-tetramethyl-4-piperidyl)butylamine are added, and the resultant mixture is warmed at 60° C. for 2 hours. A further 18 g (0.13 mol) of anhydrous potassium carbonate are added, and the mixture is warmed at 60° C. for a further 6 hours. The solvent is removed by distillation under a slight vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added, the mixture is refluxed for 2 hours and, after a further 12 hours, the water formed during the reaction is removed by azeotropic distillation. The mixture is filtered. The solution is washed with water and dried over $Na_2SO_4$. The solvent is evaporated, and the residue is dried at 120–130° C. in vacuo (0.1 mbar). Component c) is obtained as a colourless resin.

In general, component c) can be represented for example by a compound of the formula IV-1, IV-2 or IV-3. It can also be in the form of a mixture of these three compounds.

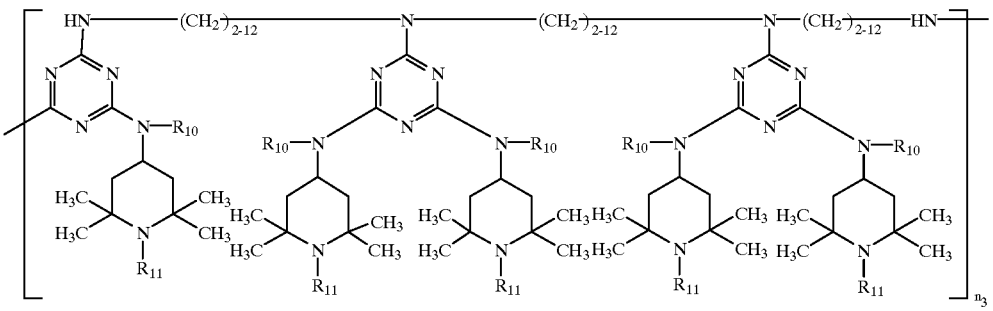

(IV-1)

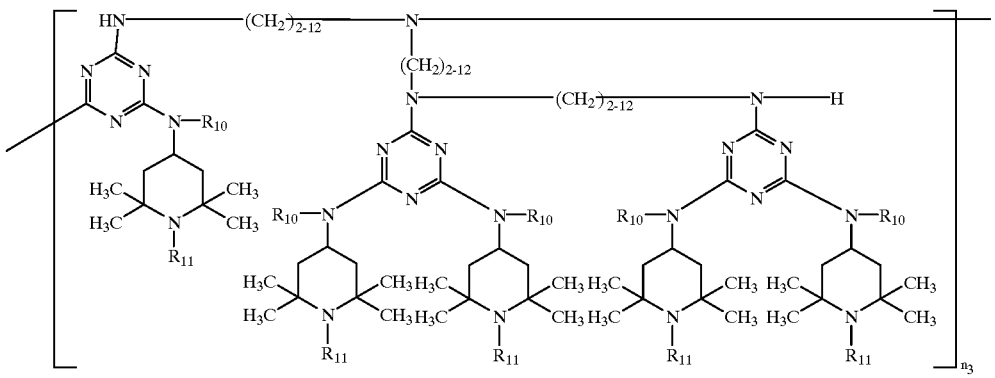
(IV-2)
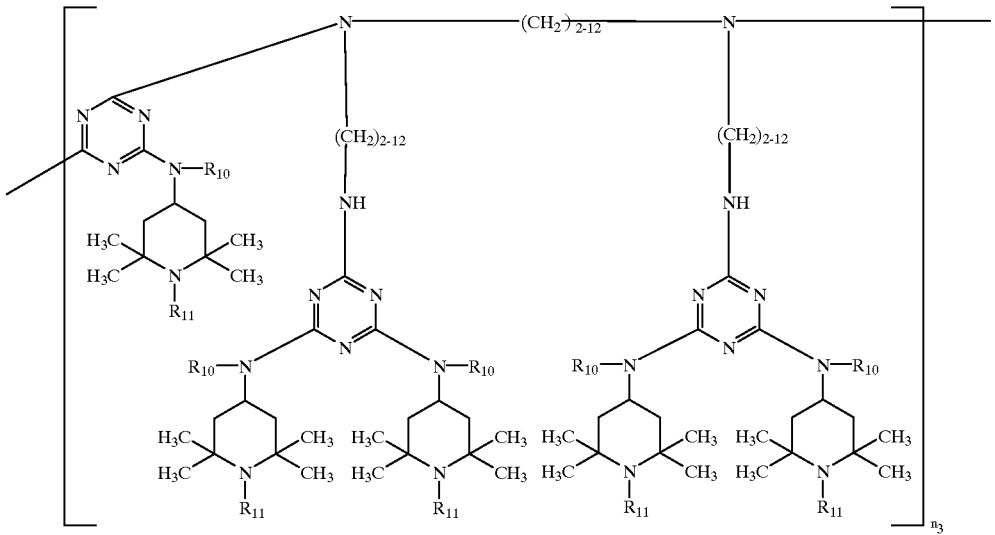
(IV-3)
A preferred meaning of the formula IV-1 is
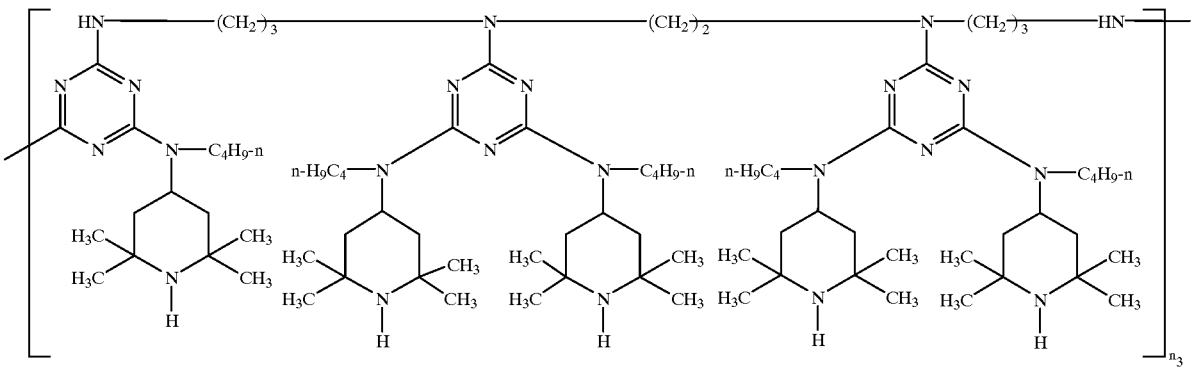

A preferred meaning of the formula IV-2 is

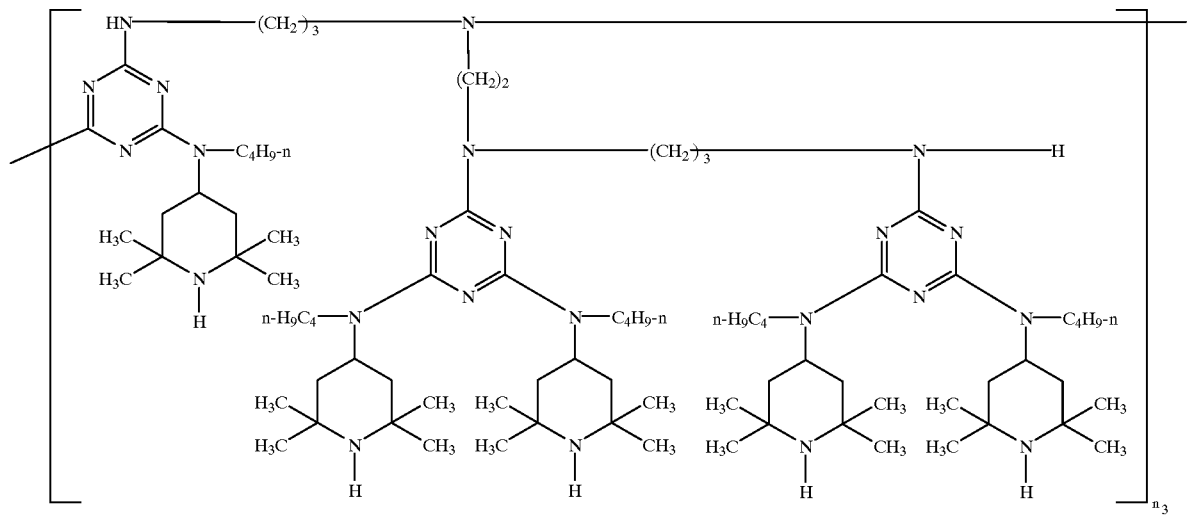

A preferred meaning of the formula IV-3 is

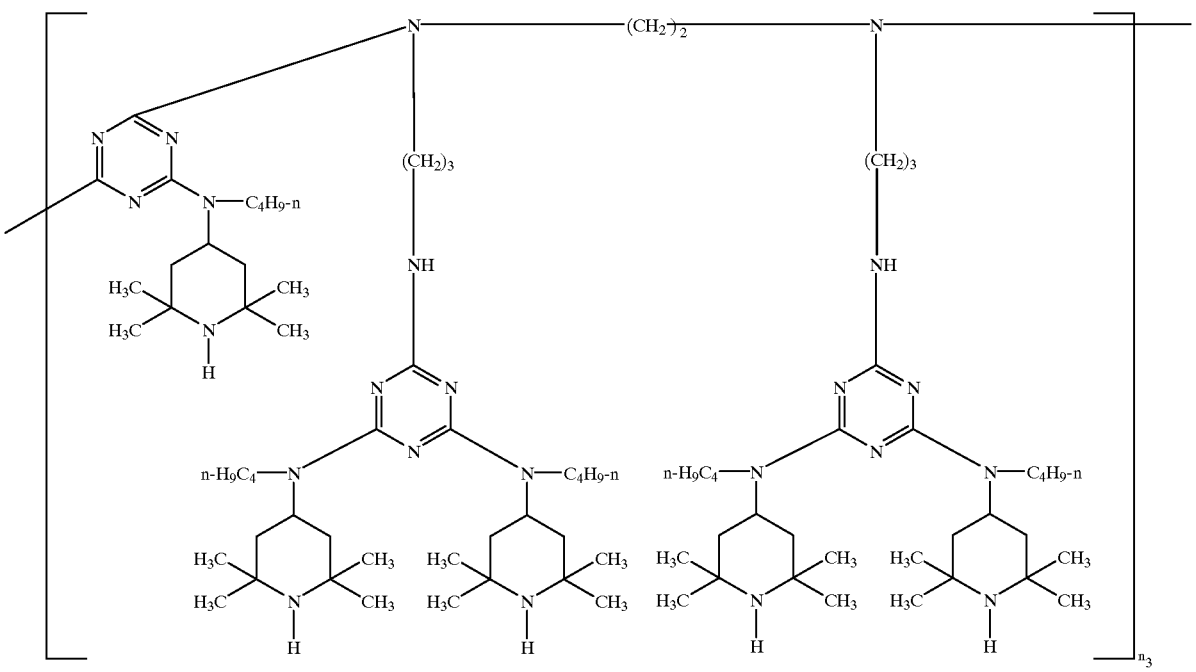

In the above formulae IV-1 to IV-3, $n_3$ is preferably 1 to 20.

Component a) is preferably ®UVASIL 299 or ®UVASIL 125, component b) is preferably ®CHIMASSORB 944, ®CYASORB UV 3346 or ®DASTAB 1082, component c) is preferably ®UVASORB HA 88, component d) is preferably ®TINUVIN 622, component e) is preferably ®HOSTAVIN N 30, component f) is preferably ®UVINUL 5050 H, ®LICHTSCHUTZSTOFF UV 31 or ®LUCHEM B 18, and component g) is preferably ®MARK LA 63 or ®MARK LA 68.

The compounds of the formulae VIa and VIb can be formed together as a mixture and also employed as such as component e) in the novel stabilizer system. The VIa:VIb ratio is, for example, from 20:1 to 1:20 or from 1:10 to 10:1.

The meanings of the terminal groups which saturate the free valences in the compounds of the formulae I, II, IV-1, IV-2, IV-3, V, VIa, VIb, VII and VIII depend on the processes used for their preparation. The terminal groups can also be modified after the preparation of the compounds.

In the compounds of the formula I, the terminal group bonded to the silicon atom can be, for example, $(R_1)_3Si—O—$, and the terminal group bonded to the oxygen can be, for example, $—Si(R_1)_3$.

The compounds of the formula I can also be in the form of cyclic compounds if $n_3$ is a number from 3 to 10, i.e. the free valences shown in the structural formula then form a direct bond.

If the compounds of the formula II are prepared by reacting a compound of the formula

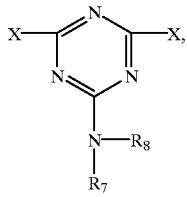

in which X is, for example, halogen, in particular chlorine, and $R_7$ and $R_8$ are as defined above, with a compound of the formula

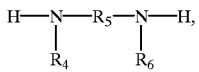

in which $R_4$, $R_5$ and $R_6$ are as defined above, the terminal group bonded to the diamino radical is hydrogen or

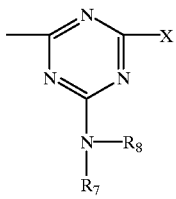

and the terminal group bonded to the triazine radical is X or

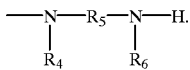

If X is halogen, it is advantageous to replace this, for example, by —OH or an amino group when the reaction is complete. Examples of amino groups which may be mentioned are pyrrolidin-1-yl, morpholino, —$NH_2$, —$N(C_1$–$C_8$ alkyl$)_2$ and —$NR(C_1$–$C_8$alkyl), in which R is hydrogen or a group of the formula III.

In the compounds of the formulae IV-1, IV-2 and IV-3, the terminal group bonded to the triazine radical is, for example, Cl or a

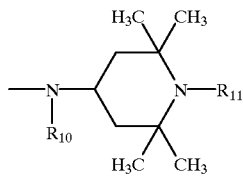

group, and the terminal group bonded to the amino radical is, for example, hydrogen or a

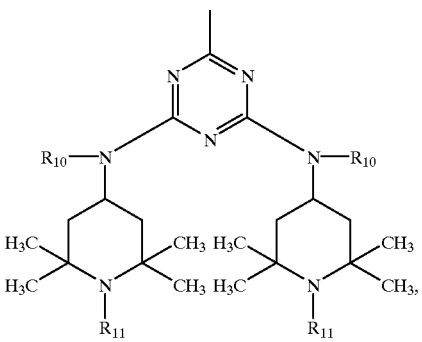

group.

If the compounds of the formula V are prepared, for example, by reacting a compound of the formula

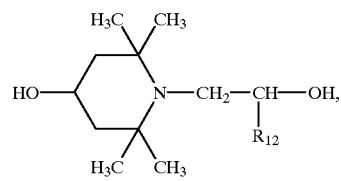

in which $R_{12}$ is hydrogen or methyl, with a dicarboxylic acid diester of the formula Y—OOC—$R_{13}$—COO—Y, in which Y is, for example, methyl, ethyl or propyl, and $R_{13}$ is as defined above, the terminal group bonded to the 2,2,6,6-tetramethyl-4-oxypiperidin-1-yl radical is hydrogen or —CO—$R_{13}$—COO—Y, and the terminal group bonded to the diacyl radical is —O—Y or

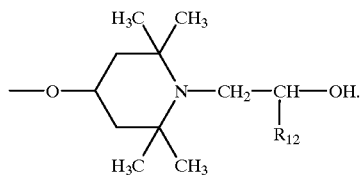

In the compounds of the formula VIa, the terminal group bonded to the nitrogen can be, for example, hydrogen and the terminal group bonded to the 2-hydroxypropylene radical can be, for example, a

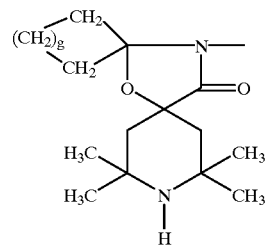

group.

In the compounds of the formula VIb, the terminal group bonded to the dimethylene radical can be, for example, —OH, and the terminal group bonded to the oxygen can be, for example, hydrogen. The terminal groups can also be polyether radicals.

In the compounds of the formula VII, the terminal group bonded to the 2,5-dioxopyrrolidine ring is, for example, hydrogen, and the terminal group bonded to the —C($R_{20}$)($R_{21}$)— radical is, for example,

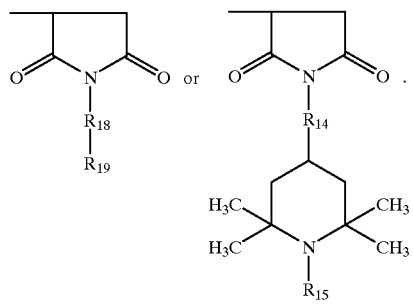

In the compounds of the formula VIII, the terminal group bonded to the carbonyl radical is, for example,

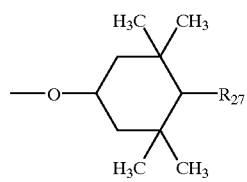

and the terminal group bonded to the oxygen radical is, for example,

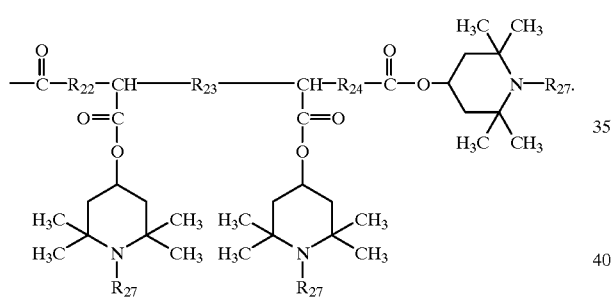

Preference is given to stabilizer mixtures in which $R_3$, $R_9$, $R_{11}$, $R_{15}$ and $R_{27}$ are hydrogen or methyl.

Preference is likewise given to stabilizer mixtures in which $R_1$ is $C_1$–$C_4$alkyl, $C_5$–$C_8$cycloalkyl or phenyl, $R_2$ is $C_3$–$C_6$alkylene, and $n_1$ is a number from 1 to 25;

$R_4$, $R_6$, $R_7$ and $R_8$, independently of one another, are hydrogen, $C_1$–$C_8$alkyl, $C_5$–$C_8$cycloalkyl, phenyl, $C_7$–$C_9$phenylalkyl or a group of the formula III, or the radicals $R_7$ and $R_8$, together with the nitrogen atom to which they are bonded, form a 6-membered heterocyclic ring, $R_5$ is $C_2$–$C_{10}$alkylene, and $n_2$ is a number from 2 to 25;

$n_3'$, $n_3''$ and $n_3'''$, independently of one another, are a number from 2 to 4, and $R_{10}$ is $C_1$–$C_4$alkyl;

$R_{12}$ is hydrogen, $R_{13}$ is ethylene, and $n_4$ is a number from 2 to 25;

$n_5$ and $n_5^*$, independently of one another, are a number from 2 to 25;

$R_{14}$ and $R_{18}$ are a direct bond or an —N($X_1$)—CO—$X_2$—CO—N($X_3$)— group, $X_1$ and $X_3$, independently of one another, are hydrogen or $C_1$–$C_4$alkyl, $X_2$ is a direct bond, $R_{16}$ and $R_{20}$ are $C_1$–$C_{25}$alkyl or phenyl, $R_{17}$ and $R_{21}$ are hydrogen or $C_1$–$C_4$alkyl, $R_{19}$ is $C_1$–$C_{25}$alkyl or a group of the formula III, and $n_6$ is a number from 1 to 25;

$R_{22}$, $R_{24}$, $R_{25}$ and $R_{26}$ are $C_1$–$C_4$alkylene, $R_{23}$ is a direct bond, and $n_7$ is a number from 1 to 25.

Particular preference is given to stabilizer mixtures in which component a) is at least one c-compound of the formula I-A

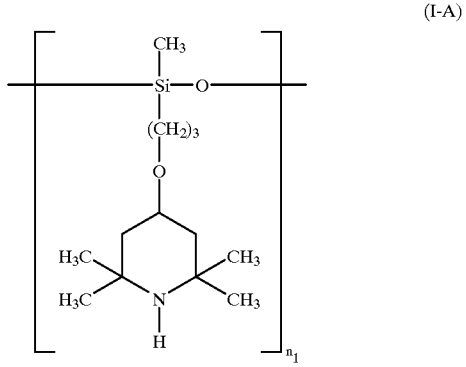

in which $n_1$ is a number from 1 to 20; component b) is at least one compound of the formula (II-B-1), (II-B-2) or (II-B-3)

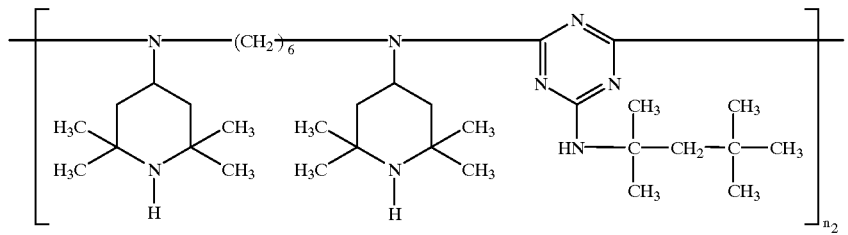

-continued

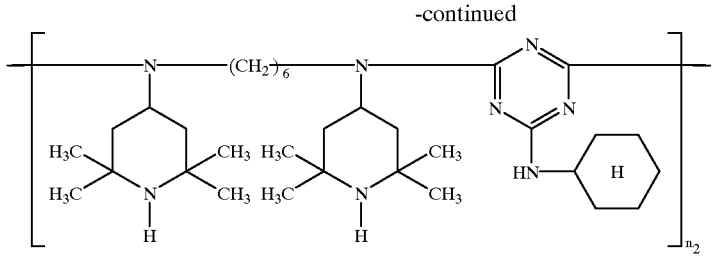

(II-B-3)

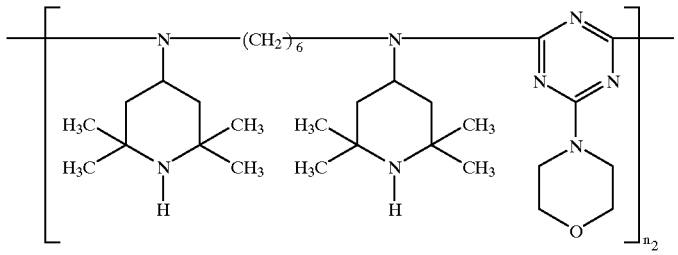

in which $n_2$ is a number from 2 to 20; component c) is a product obtainable by reacting a product, obtained by reaction of a polyamine of the formula

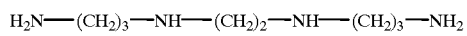

with cyanuric chloride, with a compound of the formula

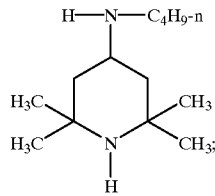

component d) is at least one compound of the formula (V-D)

(V-D)

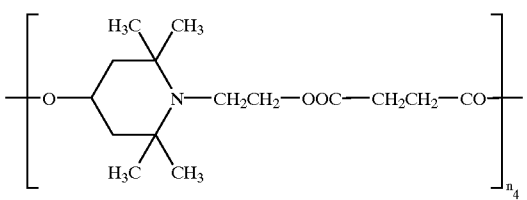

in which $n_4$ is a number from 2 to 20;

$n_5$ and $n_5^*$ in component e) are, independently of one another, a number from 2 to 20;

component f) is at least one compound of the formula (VII-F-1), (VII-F-2) or (VII-F-3)

(VII-F-1)

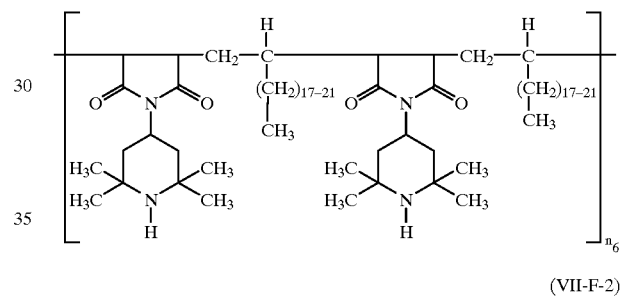

(VII-F-2)

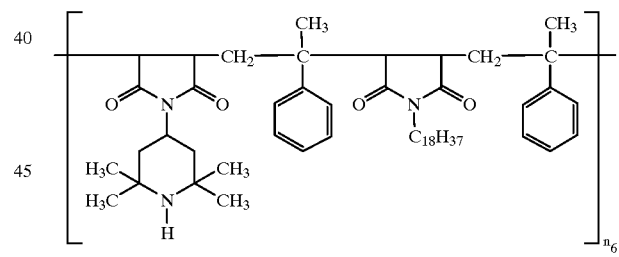

(VII-F-3)

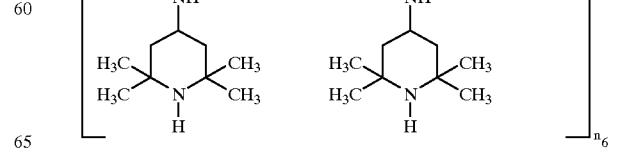

in which $n_6$ is a number from 1 to 20; component g) is at least one compound of the formula (VIII-G)

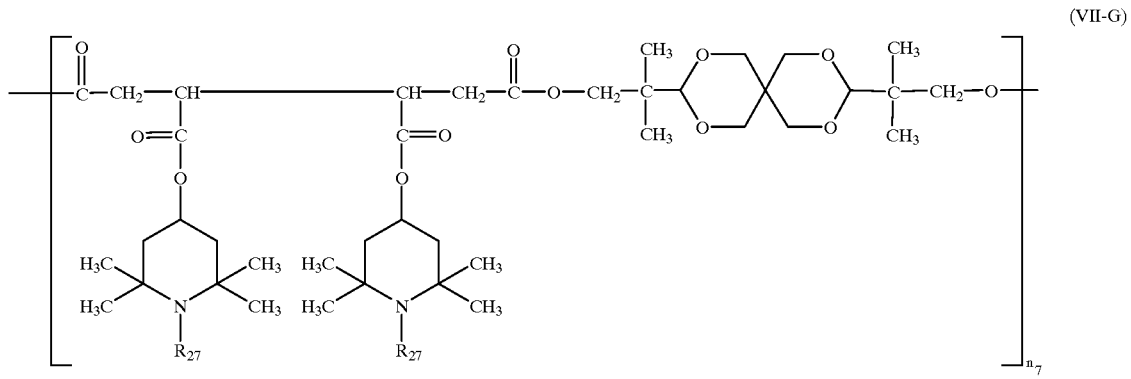

(VII-G)

in which $R_{27}$ is hydrogen or methyl, and $n_7$ is a number from 1 to 20.

The following stabilizer mixtures may be mentioned as examples:

1. a stabilizer mixture comprising components a) and b),
2. a stabilizer mixture comprising components a) and c),
3. a stabilizer mixture comprising components a) and d),
4. a stabilizer mixture comprising components a) and e),
5. a stabilizer mixture comprising components a) and f) and
6. a stabilizer mixture comprising components a) and g).

Particular preference is given to the following stabilizer systems:

a) a stabilizer mixture comprising at least one compound of the formula (I-A) and at least one compound of the formula (II-B-1), b) a stabilizer mixture comprising at least one compound of the formula (I-A) and at least one compound of the formula (II-B-3), c) a stabilizer mixture comprising at least one compound of the formula (I-A) and a product obtainable by reacting a product, obtained by reaction of a polyamine of the formula

with cyanuric chloride, with a compound of the formula

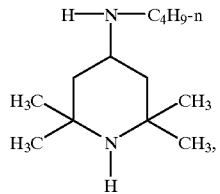

d) a stabilizer mixture comprising at least one compound of the formula (I-A) and at least one compound of the formula (V-D), and e) a stabilizer mixture comprising at least one compound of the formula (I-A) and at least one compound of the formulae (VIa) and (VIb).

In the abovementioned stabilizer systems, the two components are particularly preferably in a weight ratio of 1:1.

The novel stabilizer mixture is suitable for stabilizing organic materials against thermal, oxidative or light-induced degradation. Examples of such materials are the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/ butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyarnide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

The invention therefore furthermore relates to a composition comprising an organic material which is sensitive to oxidative, thermal or light-induced degradation and a novel stabilizer mixture.

The organic material is preferably a synthetic polymer, in particular from one of the above groups. Polyolefins are preferred, and polyethylene, polypropylene and copolymers thereof are particularly preferred.

The components of the novel stabilizer system can be added to the material to be stabilized either individually or mixed with one another. The components can be employed, independently of one another, in amounts of from 0.01 to 4.99%, with the proviso that the total amount of component a) and component b), c), d), e), f) or g) is from 0.02 to 5%, based on the total weight of the material to be stabilized.

The total amount of component a) and component b), c), d), e), f) or g) is preferably from 0.05 to 3%, in particular from 0.05 to 2%, or from 0.05 to 1%, based on the total weight of the material to be stabilized.

The weight ratio between component a) and component b), c), d), e), f) or g) is preferably from 20:1 to 1:20, in particular from 10:1 to 1:10, for example from 5:1 to 1:5.

The novel stabilizer mixture or the individual components thereof can be incorporated into the organic material by known methods, for example before or during shaping or by applying the dissolved or dispersed compounds to the organic material, if necessary with subsequent evaporation of the solvent. The individual components of the novel stabilizer mixture can be added to the materials to be stabilized in the form of a powder, granules or a masterbatch, which contains these components in, for example, a concentration of from 2.5 to 25% by weight.

If desired, the components of the novel stabilizer system can be melt blended with each other before incorporation in the organic material.

The novel stabilizer system or its components can be added before or during the polymerization or before the crosslinking.

The materials stabilized in this way can be used in a wide variety of forms, for example as films, fibres, tapes, moulding compositions, profiles or as binders for paints, adhesives or putties.

The stabilized organic materials of the invention may additionally also contain various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butylhydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)

butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O-, N- and S-benzyl compounds, for example 3,5,3',5'-tetra-tert-butyl-4,4'-dihydroxy-dibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis-[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-di-methylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, Bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octylphenothiazines, N-allylphenothiazin, N,N,N',N'-tetraphenyl-1,4diaminobut- 2-ene, N,N-bis(2,2,6,6-tetramethyl-piperid-4-yl-hexamethylenediamine, bis(2,2,6,6-tetramethylpiperid-4-yl) sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzoriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$–]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis (4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate; bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dion, bis(1-octyloxy-2,2,6,6-tetramethylpiperidyl) sebacate, bis(1-octyloxy-2,2,6,6-tetramethylpiperidyl) succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis-(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane und epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2-Hydroxypheny)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]4,6-bis(2,4-dimethylphenyl)-1,3,5-triazine, 2-[2-hydroxy-4-(2- hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaetythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methylphosphite, bis(2,4-di-tert-butyl-6-methylphenyl) ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863, 4,338,244, 5,175,312, 5,216,052, 5,252,643, DE-A-4 316 611, DE-A-4 316 622, DE-A-4 316 876, EP-A-0 589 839 or EP-A-0 591 102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The weight ratio between the novel stabilizer mixture and the conventional additives can be, for example, from 1:0.5 to 1:5.

The invention furthermore relates to the use of the novel stabilizer mixture for stabilizing organic material against oxidative, thermal or light-induced degradation.

The organic materials stabilized by means of the novel stabilizer system are distinguished not only by significantly improved light stability, but also in some cases by improved thermal stability.

The example below illustrates the invention in greater detail. All percentages are by weight, unless stated otherwise.

Light Stabilizers used in Examples 1–2

Compound A

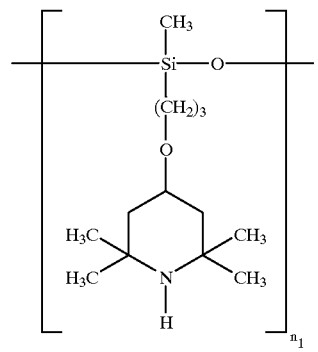

The mean value of $n_1$ is 5.8.

Compound B-1

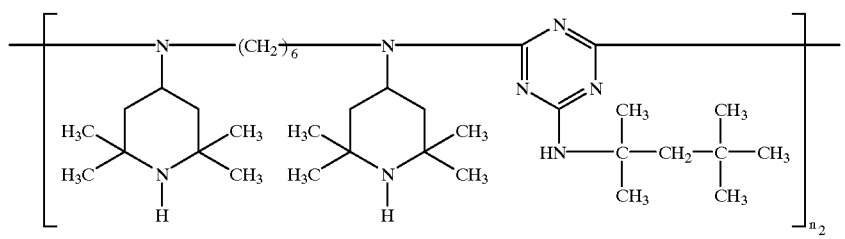

The mean value of $n_2$ is 4.5.

Compound B-2

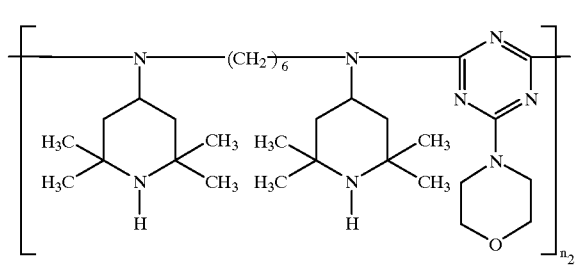

The mean value of $n_2$ is 3.5.

Compound C

A product obtainable by reacting a product, obtained by reaction of a polyamine of the formula

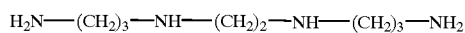

with cyanuric chloride, with a compound of the formula

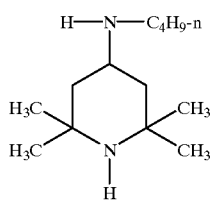

Compound D

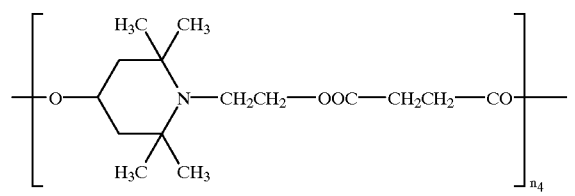

The mean value of $n_4$ is 5.1.

Compound E

A mixture of the compounds

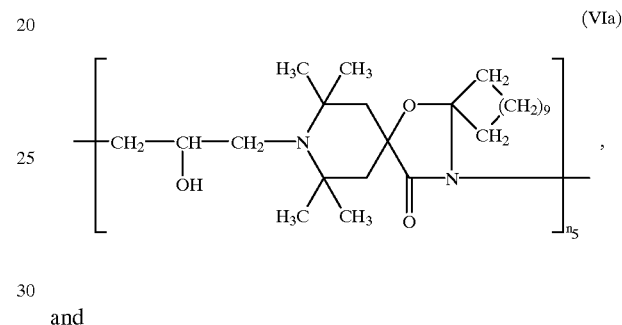

(VIa)

and

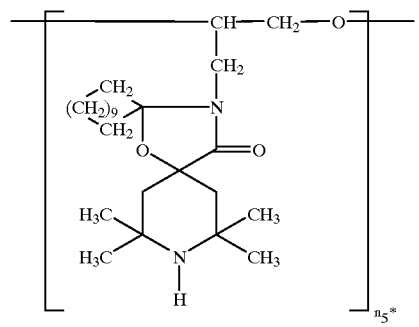

(VIb)

in which the mean value of $n_5$ is about 3.9 and the mean value of $n_5^*$ is about 4.2, and the ratio between (VIa) and (VIb) is about 4:1.

Compound F-1

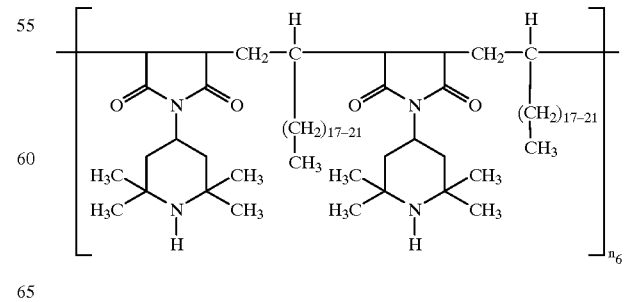

The mean value of $n_6$ is 3.2.

Compound F-2

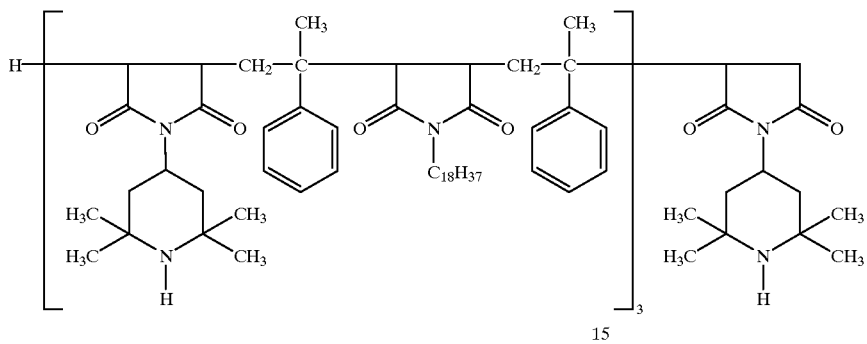

Compound G-1

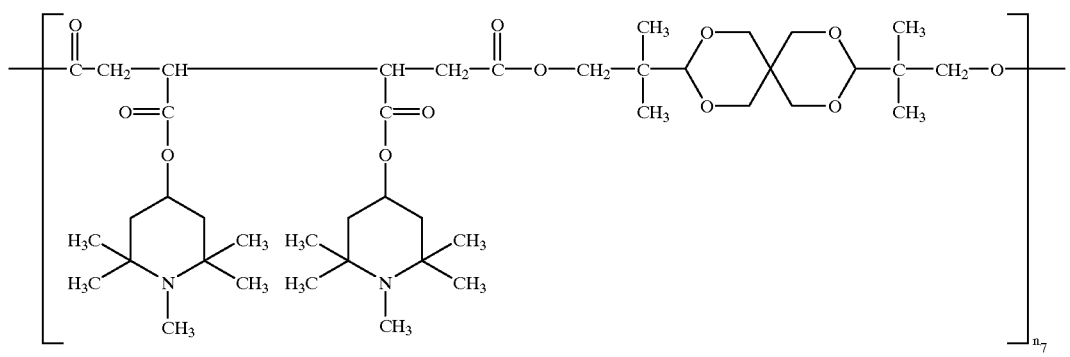

The mean value of $n_7$ is 2.5.

Compound G-2

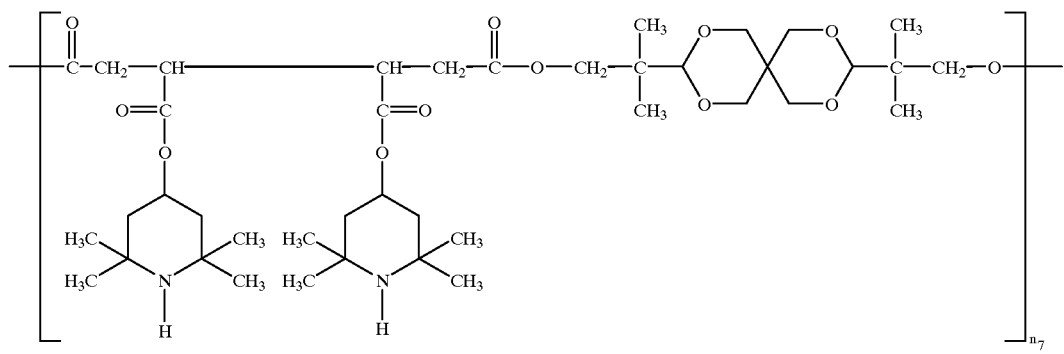

The mean value of $n_7$ is 2.5.

Example 1

Light stabilization action in polypropylene block copolymer films.

100 parts of polypropylene block copolymer powder are homogenized for 10 minutes at 200° C. in a Brabender plastograph with 0.05 part of pentaerythrityl tetrakis[3-(3, 5-di-tert-butyl-4-hydroxyphenyl)propionate, 0.10 part of tris (2,4-di-tert-butylphenyl)phosphite, 0.1 part of calcium stearate and the light stabilizers shown in Table 1. The composition obtained is removed from the compounder as rapidly as possible and pressed in a toggle press to give a sheet with a thickness of 2–3 mm. A piece of the resultant green pressing is cut out and pressed between two high-gloss hard aluminium foils for 6 minutes at 260° C. by means of a hydraulic bench press to give a sheet with a thickness of 0.5 mm, which is immediately cooled in a water-cooled press. Pieces each measuring 60 mm×25 mm are then stamped out of this 0.5 mm sheet and exposed to light in a WEATHER-O-METER Ci 65 (black panel temperature 63±2° C., no exposure to rain water). These test specimens are removed from the exposure apparatus at regular intervals and tested for their carbonyl content in an IR spectrometer. The increase in the carbonyl absorbance during exposure is a measure of the photooxidative degradation of the polymer and is known from experience to be associated with a deterioration in the mechanical properties. The results are shown in Table 1.

TABLE 1

| Light stabilizer | Hours in WEATHER-O-METER Ci 65 to 0.2 carbonyl absorbance |
|---|---|
| None | 110 |
| 0.2% of compound A | 2560 |
| 0.2% of compound B-1 | 1740 |
| 0.2% of compound B-2 | 2280 |
| 0.2% of compound C | 2400 |
| 0.2% of compound D | 2040 |
| 0.2% of compound E | 1710 |
| 0.2% of compound F-1 | 505 |
| 0.2% of compound F-2 | 260 |
| 0.2% of compound G-1 | 1410 |
| 0.2% of compound G-2 | 1230 |
| 0.1% of compound A and 0.1% of compound B-1 | 2890 |
| 0.1% of compound A and 0.1% of compound B-2 | 2880 |
| 0.1% of compound A and 0.1% of compound C | 2990 |
| 0.1% of compound A and 0.1% of compound D | 2950 |
| 0.1% of compound A and 0.1% of compound E | 2400 |
| 0.1% of compound A and 0.1% of compound F-1 | 1840 |
| 0.1% of compound A and 0.1% of compound F-2 | 1610 |
| 0.1% of compound A and 0.1% of compound G-1 | 2160 |
| 0.1% of compound A and 0.1% of compound G-2 | 2100 |

Example 2

Light stabilization action in high-density polyethylene films.

100 parts of high-density polyethylene powder (density= 0.965 g/cm$^3$) are homogenized for 10 minutes at 180° C. in a Brabender plastograph with 0.033 part of pentaerythrityl tetrakis[3-(3,5-di-tert-butyl-4-hydroxyphenyl)propionate], 0.066 part of tris(2,4-di-tert-butylphenyl)phosphite, 0.1 part of calcium stearate and the light stabilizers shown in Table 2. The composition obtained is removed from the compounder as rapidly as possible and pressed in a toggle press to give a sheet with a thickness of 2–3 mm. A piece of the resultant green pressing is cut out and pressed between two high-gloss hard aluminium foils for 6 minutes at 210° C. by means of a hydraulic bench press to give a sheet with a thickness of 0.5 mm, which is immediately cooled in a water-cooled press. Pieces measuring 60 mm×25 mm are then stamped out of this 0.5 mm sheet and exposed to light in a Weather-O-Meter Ci 65 (black panel temperature 63±2° C., no exposure to rain water). These test specimens are removed from the exposure apparatus at regular intervals and tested for their vinyl group content in an IR spectrometer. The increase in the vinyl absorbance (909 cm$^{-1}$) during exposure is a measure of the photooxidative degradation of the polymer and is known from experience to be associated with a deterioration in the mechanical properties. The results are shown in Table 2.

TABLE 2

| Light stabilizer | Vinyl absorbance after 7222 hours in the WEATHER-O-METER Ci 65 |
|---|---|
| None | 0.097 after 318 hours |
| 0.1% of compound A | 0.039 |
| 0.1% of compound B-1 | 0.052 |
| 0.1% of compound B-2 | 0.043 |
| 0.1% of compound C | 0.054 |
| 0.1% of compound D | 0.039 |
| 0.1% of compound E | 0.046 |
| 0.1% of compound F-1 | 0.058 |
| 0.1% of compound F-2 | 0.143 after 5286 hours |
| 0.1% of compound G-1 | 0.040 |
| 0.1% of compound G-2 | 0.040 |
| 0.05% of compound A and 0.05% of compound B-1 | 0.038 |
| 0.05% of compound A and 0.05% of compound B-2 | 0.038 |
| 0.05% of compound A and 0.05% of compound C | 0.040 |
| 0.05% of compound A and 0.05% of compound D | 0.029 |
| 0.05% of compound A and 0.05% of compound E | 0.039 |
| 0.05% of compound A and 0.05% of compound F-1 | 0.036 |
| 0.05% of compound A and 0.05% of compound F-2 | 0.045 |
| 0.05% of compound A and 0.05% of compound G-1 | 0.030 |
| 0.05% of compound A and 0.05% of compound G-2 | 0.035 |

What is claimed is:

1. A stabilizer composition comprising a component a) and a component c), where component a) is at least one compound of the formula I

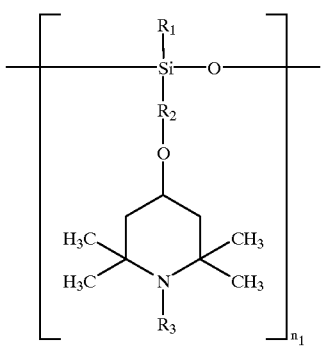

in which

R$_1$ is C$_1$–C$_{10}$alkyl, C$_5$–C$_{12}$cycloalkyl, C$_1$–C$_4$alkyl-substituted C$_5$–C$_{12}$cycloalkyl, phenyl or C$_1$–C$_{10}$alkyl-substituted phenyl, R$_2$ is C$_3$–C$_{10}$alkylene, R$_3$ is hydrogen, C$_1$–C$_8$alkyl, O, —CH$_2$CN, C$_3$–C$_6$alkenyl, C$_7$–C$_9$phenylalkyl, C$_7$–C$_9$phenylalkyl which is substituted on the phenyl radical by C$_1$–C$_4$alkyl; or C$_1$–C$_8$acyl and, n$_1$ is a number from 1 to 50; and component c) is a product obtainable by reacting a product, obtained by reaction of a polyamine of the formula IVa with cyanuric chloride, with a compound of the formula IVb

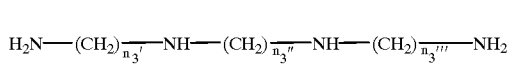  (IVa)

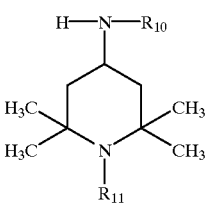  (IVb)

in which
n$_3'$, n$_3''$ and n$_3'''$, independently of one another are a number from 2 to 12,
R$_{10}$ is hydrogen, C$_1$–C$_{12}$alkyl, C$_5$–C$_{12}$cycloalkyl, phenyl or C$_7$–C$_9$phenylalkyl, and
R$_{11}$ is as defined for R$_3$;
a weight ratio between component a) and component c) being about 5:1 to about 1:5.

2. A stabilizer mixture according to claim 1, in which component a) is at least one compound of the formula I-A

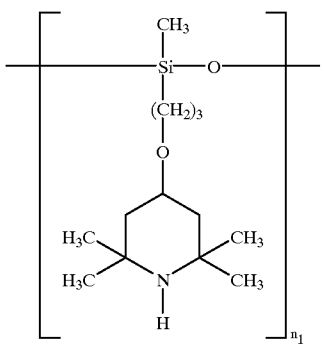  (I-A)

in which n$_1$ is a number from 1 to 20; and
component c) is a product obtainable by reacting a product, obtained by reaction of a polyamine of the formula

with cyanuric chloride, with a compound of the formula

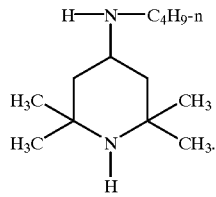

3. A stabilizer mixture according to claim 1 in which R$_3$ and R$_{11}$ are hydrogen or methyl.

4. A stabilizer mixture according to claim 1, in which
R$_1$ is C$_1$–C$_4$alkyl, C$_5$–C$_8$cycloalkyl or phenyl,
R$_2$ is C$_3$–C$_6$alkylene,
n$_3'$, n$_3''$, and n$_3'''$, independently of one another, are a number from 2 to 4, and
R$_{10}$ is C$_1$–C$_4$alkyl.

5. A stabilizer mixture according to claim 1, which comprises components a) and c) in a weight ratio of 1:1.

6. A composition comprising an organic material which is sensitive to oxidative, thermal or light-induced degradation and a stabilizer mixture according to claim 1.

7. A composition according to claim 6, in which the organic material is a polyolefin.

8. A composition according to claim 6, in which the organic material is polyethylene, polypropylene or a copolymer of polyethylene or polypropylene.

9. A method for stabilizing an organic material which is sensitive to oxidative, thermal or light-induced degradation, which comprises incorporating in said organic material a stabilizer mixture according to claim 1.

* * * * *